July 17, 1962

A. H. OSBORNE 3,044,808

ADJUSTOR LOCKING MEANS

Filed Feb. 3, 1958

INVENTOR.
ALBERT H. OSBORNE
BY John A. Young
ATTORNEY

July 17, 1962 A. H. OSBORNE 3,044,808
ADJUSTOR LOCKING MEANS
Filed Feb. 3, 1958 3 Sheets-Sheet 3

INVENTOR.
ALBERT H. OSBORNE
BY John A. Young
ATTORNEY

United States Patent Office 3,044,808
Patented July 17, 1962

3,044,808
ADJUSTOR LOCKING MEANS
Albert H. Osborne, South Bend, Ind., assignor to The Bendix Corporation, a corporation of Delaware
Filed Feb. 3, 1958, Ser. No. 712,896
2 Claims. (Cl. 287—53)

This invention is directed to means for locking the components of an adjustor which is commonly used in a disk type brake, the purpose in locking the adjustor being to hold the components of the adjustor in a selected position in order to maintain the proper brake adjustment.

This invention will be described in combination with a disk type brake, although it is apparent that the invention can be used with a wide variety of adjustors and in combination with any desired brake configuration.

A brake adjustment is generally made by suitably locating a stop which limits retraction of one of the brake members. This is usually done by screwing one threaded member within a second threaded member; the relative positioning of the two members adjusts the brake.

Once an adjustment is made, it is important that the relative positioning of the members not be disturbed by vibration or jarring of the brakes; otherwise, the adjustment is lost or a false adjustment is rendered. It is, therefore, necessary to lock the adjustor components in place after an adjustment is made to guard against this contingency.

It has been previously the practice, where a number of adjustors are used in a disk brake, to wire the various adjustors together so that they cannot be accidentally turned by vibration, jars, etc. which normally occur during use. This wiring together of the adjustors is a time consuming and expensive operation. Also, the adjustors can still turn slightly despite the best efforts at wiring the adjustor heads together.

It is one of the principal objects of the present invention to provide a very simple locking mechanism for an adjustor device which will hold the adjustor components in the proper setting.

The method followed in this invention is to individually lock the adjustors by means of a slender rod, which may take the form of a wire, the rod being passed along the length of the adjustor within aligned grooves formed in screwed together, threaded members of the adjustor.

It is a further object of the present invention to hold the locking rod or wire in place by a very simple and inexpensive technique so that it can be readily removed to permit a readjustment and then replaced without any appreciable difficulty.

Other objects and features of the invention will become apparent from a consideration of the following description, which proceeds with reference to the accompanying drawings in which.

Figure 1:
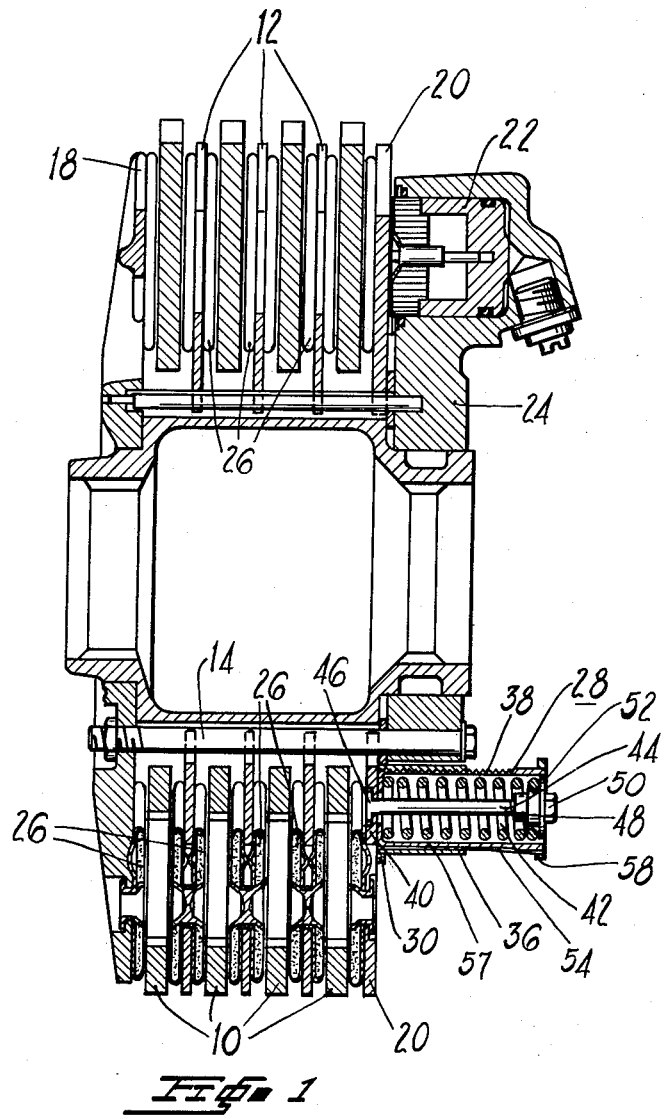
FIGURE 1 is an axial section view taken through a disk brake having adjustors with the invention incorporated therein.

Referring to FIGURE 1, there is shown a stack of interleaved rotors 10 and stators 12 which are splined respectively to rotatable and nonrotatable members through keys.

The stack is clamped against a reaction plate 18 by a pressure plate 20 which is moved axially by a number of spaced fluid motor actuators 22 which are received in brake carrier 24.

As the friction lining 26 on the brake stators wears during brake application, the pressure plate 20 needs to be moved closer to the backing plate 18 to compensate for wear of the lining in order to maintain the original running clearance of the brake members.

Figure 2:
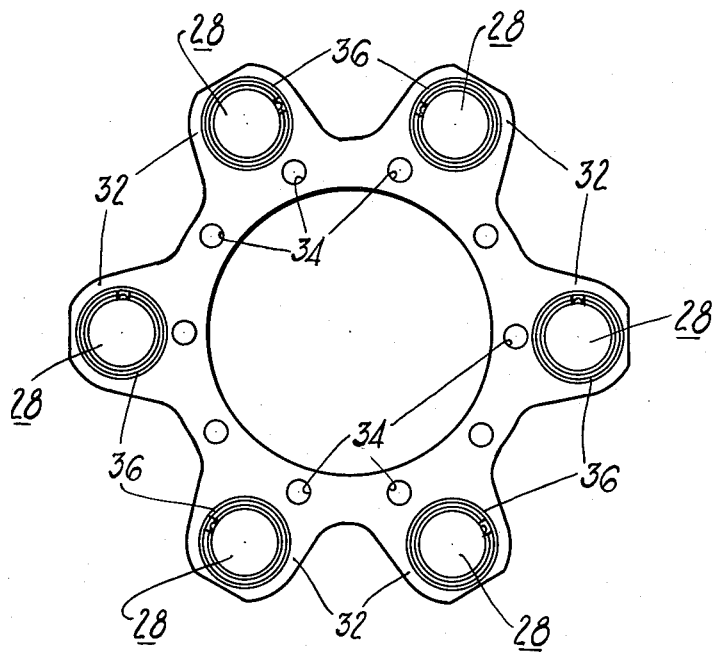
FIGURE 2 is a detail view of the carrier plate for the adjustors.

The pressure plate 20 is adjusted laterally by means of a number of circumferentially spaced adjustors designated generally by reference numeral 28. The adjustors are supported on a carrier plate 30 (see FIGURE 2) which has a number of radially projecting portions 32, one for each adjustor. The inner periphery of the carrier 30 has opening 34 into which are passed the keys 14, these keys also serving to attach the brake carrier 24.

Figure 3:
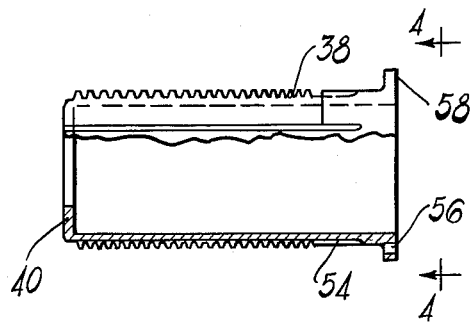
FIGURE 3 is a detail view of the adjustor tube.

Perpendicularly mounted in each projection 32 of carrier plate 30 is an internally threaded sleeve 36. An externally threaded tubular member 38 (see FIGURE 3) is screwed into this sleeve and provides an abutment 40 at the one end thereof which serves as a stop for the pressure plate 20. Within the adjustor tubular member 38 is a coil spring 42 and a stem 44 having a boss 46 attached to the pressure plate. At the threaded end 48 of the stem a nut 50 and washer 52 is provided to load the spring 42 so that the desired retracting force can be developed on the pressure plate 20 through the stem 44.

As mentioned previously, the retracted position of the pressure plate 20 is determined by the location of end 40 of the tubular adjustor member 38; the tubular adjustor member can be screwed back and forth within the sleeve 36 to establish the retracted position for the pressure plate 20.

Figure 4:
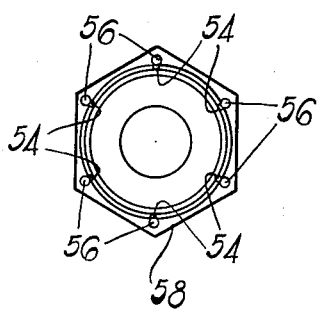
FIGURE 4 is an end view of the adjustor tube looking in the direction of arrows 4—4 of FIGURE 3.
Figure 5:
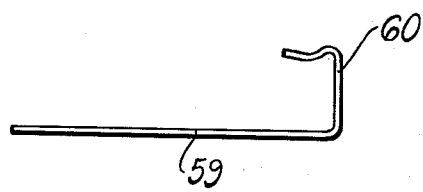
FIGURE 5 shows the wire as it appears before the insertion.

From this explanation of the operation of the operation of the adjustor, it is apparent that it is the relative position of the tubular adjustor member 38 within the sleeve 36 which determines the brake adjustment. Therefore, after the selected position is established for the tubular adjustor member, it must be held in this position against accidental movement. Accordingly, I have provided a number of longitudinal grooves 54 in the threaded outer surface of tubular member 38, these grooves being matched with holes 56 (see FIGURE 4) around the circumference of a collar 58 at the end of the adjustor tube. The collar has irregularly shaped sides to facilitate gripping the adjustor tube for turning same.

There are six of these grooves 54 in the threaded portion of the adjustor tube. A complementary groove 57 is formed in the threaded part of sleeve 36 so that when one of the grooves 54 of the tubular adjustor member 38 is aligned with the groove in the sleeve 36 a slender rod 59 can be fitted therebetween. The wire 59 is first passed through opening 56 of the collar 58 as it passes along groove 54 and then fits closely within the matched groove 57 in the sleeve 36. The tubular adjustor member 38 becomes locked against rotation in either direction. The end 60 of the wire 59 is bent over and turned back so that it passes through an adjacent opening 56 in the collar 58 so that the wire 59 is locked against dislocation once it is slipped in place.

When wear of the friction material 26 becomes excessive then the adjustor tube is adjusted manually by first removing the wire 59 and then turning the adjustor tube to bring the end 40 to the left (referring to FIGURE 1). The retracted position of the pressure plate 20 is thereby moved closer to the backing member 18. Because of the six grooves 54 in the adjustor tube the adjustor tube can be locked in any position wherein one of the grooves 54 in the tubular member 38 aligns with the groove 57 in sleeve 36. Very refined adjustments can be provided since the tubular member is adjustable at increments of one-sixth of a revolution of the tubular adjustor 38. At the new adjusted position for the adjustor tube, one of the grooves 54 aligns with the groove 57 in the sleeve 36, the wire 59 is reinserted and the end of the wire passed through an adjacent opening 56 in the collar 58.

Locking and unlocking the adjustor tube is a very simple matter and any adjustor can be adjusted individually without disrupting the lock for the other adjustors. This is an obvious advantage because the pressure plate 20 should be aligned squarely with respect to the stack of rotors and stators thus necessitating individual adjustment of the adjustors.

The wire which is received in the grooves locks the members against the movement with a considerable force. Unlike the key and keyway lock, the wire, if stressed beyond its tensile strength, will be split up by the threads and will cause a jamming of the threaded portion, this having the effect of clogging the threads and binding the two parts against rotation with a very considerable force. As a result, there is no likelihood of the adjustor tube rotating within the sleeve even if the adjustor tube should be stressed beyond the tensile strength of the wire. As a result, the single strand of wire provides a very effective locking action on the adjustor members which is far in excess of that expected from tensile strength thereof. The adjustor parts are locked in place very effectively, and the locking action is easy to perform and can be varied at will.

Although the invention has been described in connection with a single example embodiment, it will be apparent to those skilled in the art that numerous modifications and revisions of the invention are possible. It is intended that such revisions, variations, and applications on the invention are to be reasonably expected on the part of those skilled in the art, and will be included in the scope of the following claims.

I claim:

1. A brake adjustor comprising: an internally threaded sleeve, an externally threaded tubular member threadedly received in said sleeve, said threaded sleeve and tubular members being relatively movable to effect brake adjustment, a plurality of longitudinal grooves in the threaded portion of said sleeve and said tubular member respectively which can be aligned by turning said tubular member within said sleeve, a collar formed at the end of said tubular member, a wire which is passed through an opening in the collar and the aligned grooves in the threaded portion of said sleeve and said tubular member to lock them against relative rotation, and a bent over end of said wire which is passed through a second opening in the collar of said tubular member to keep the wire from being dislodged in its locking position.

2. A brake adjustor comprising: a threaded sleeve which is relatively fixed, a tubular member threadedly received in said sleeve, said adjustor being operated by screwing the tubular member within said sleeve to vary the displacement of the tubular member to effect brake adjustment, a plurality of longitudinal grooves formed in the threaded portion of said sleeve and tubular member, said grooves being registerable by turning the tubular member within the sleeve, a collar at one end of said tubular member having at least two openings therein, one of said openings being aligned with a groove in the threaded portion of said tubular member, a slender rod which is passed through an opening in the collar and is fitted within matched grooves in the sleeve and tubular member respectively to lock the two together, and a bent over end of said slender rod which is passed through the opening in said collar to fix the rod in place.

References Cited in the file of this patent
UNITED STATES PATENTS

| | | |
|---|---|---|
| 56,631 | Stiles | July 24, 1866 |
| 1,017,371 | Beck | Feb. 13, 1912 |
| 1,437,080 | Adenot | Nov. 28, 1922 |
| 1,578,424 | Godshalk | Mar. 30, 1926 |
| 1,788,806 | Ruesenberg | Jan. 31, 1931 |
| 1,898,298 | Frank | Feb. 21, 1933 |
| 2,452,458 | Hahn | Oct. 26, 1948 |
| 2,564,447 | Pritchard | Aug. 14, 1951 |
| 2,596,556 | Hollerith | May 13, 1952 |
| 2,620,901 | Stearns | Dec. 9, 1952 |
| 2,776,580 | Tack | Jan. 8, 1957 |